(12) United States Patent
Disteldorf et al.

(10) Patent No.: US 11,498,867 B2
(45) Date of Patent: Nov. 15, 2022

(54) COATED ARTICLE WITH IR REFLECTING LAYER DESIGNED FOR LOW U-VALUE AND HIGHER G-VALUE AND METHOD OF MAKING SAME

(71) Applicants: GUARDIAN GLASS, LLC, Auburn Hills, MI (US); GUARDIAN EUROPE S.A.R.L., Bertrange (LU)

(72) Inventors: Bernd Disteldorf, Bertrange (LU); Anton Dietrich, Bertrange (LU); Francis Wuillaume, Auburn Hills, MI (US)

(73) Assignees: GUARDIAN GLASS, LLC, Auburn Hills, MI (US); GUARDIAN EUROPE S.A.R.L., Bertrange (LU)

( * ) Notice: Subject to any disclaimer, the term of this patent is extended or adjusted under 35 U.S.C. 154(b) by 0 days.

(21) Appl. No.: 16/948,812

(22) Filed: Oct. 1, 2020

(65) Prior Publication Data
US 2022/0106226 A1     Apr. 7, 2022

(51) Int. Cl.
*C03C 17/36*     (2006.01)

(52) U.S. Cl.
CPC ........ *C03C 17/366* (2013.01); *C03C 17/3618* (2013.01); *C03C 17/3626* (2013.01); *C03C 17/3642* (2013.01); *C03C 17/3644* (2013.01); *C03C 17/3681* (2013.01); *C03C 2218/155* (2013.01)

(58) Field of Classification Search
CPC .............. C03C 17/366; C03C 17/3644; C03C 17/3681; C03C 17/3642; C03C 17/3647; C03C 17/3621; C03C 2217/734; C03C 2217/213; C03C 2217/285; B32B 17/1022; B32B 17/10229
See application file for complete search history.

(56) References Cited

U.S. PATENT DOCUMENTS

| 5,770,321 A | 6/1998 | Hartig |
| 5,800,933 A | 9/1998 | Hartig |
| 6,524,714 B1 | 2/2003 | Neuman |

(Continued)

FOREIGN PATENT DOCUMENTS

| DE | 102014111190 A1 * | 10/2015 | ............. C03C 17/36 |
| EP | 0937013 A1 | 8/1999 | |

(Continued)

OTHER PUBLICATIONS

International Search Report and Written Opinion received for PCT Application No. PCT/IB2021/058582, dated Dec. 20, 2021, 10 pages.

*Primary Examiner* — Z. Jim Yang

(57) ABSTRACT

A coated article incudes a low-emissivity (low-E) coating having at least one infrared (IR) reflecting layer of or including a material such as silver or the like. The low-E coating is designed so that the coated article can realize a low U-value in combination with a high solar heat gain (g value). In the top dielectric portion of the coating above the silver, a high-low-high refractive index sequence is provided. This allows for a low U-value and a higher g value to be obtained for a given silver thickness. Coated articles herein may be used in the context of insulating glass (IG) window units, or in other suitable applications such as monolithic window applications, laminated windows, and/or the like.

24 Claims, 2 Drawing Sheets

(56) References Cited

U.S. PATENT DOCUMENTS

| | | | |
|---|---|---|---|
| 6,541,084 B2 | 4/2003 | Wang | |
| 6,576,349 B2 | 6/2003 | Lingle | |
| 6,589,658 B1* | 7/2003 | Stachowiak | C03C 17/36 428/704 |
| 8,263,227 B2 | 9/2012 | Disteldorf et al. | |
| 10,100,202 B2 | 10/2018 | Disteldorf | |
| 2003/0150711 A1 | 8/2003 | Laird | |
| 2005/0238923 A1* | 10/2005 | Thiel | C03C 17/36 428/701 |
| 2006/0121290 A1* | 6/2006 | Chonlamaitri | C23C 14/0676 428/428 |
| 2013/0216860 A1* | 8/2013 | Imran | C03C 17/366 428/428 |
| 2014/0022630 A1* | 1/2014 | Reymond | C03C 17/3626 359/360 |
| 2016/0077320 A1* | 3/2016 | Okada | C03C 17/3626 204/192.27 |
| 2016/0122236 A1* | 5/2016 | Mahieu | C03C 17/3639 428/332 |
| 2016/0122238 A1* | 5/2016 | Roquiny | C03C 17/366 204/192.15 |
| 2017/0059750 A1* | 3/2017 | Diguet | G02B 5/26 |
| 2018/0066142 A1* | 3/2018 | Disteldorf | C09D 4/00 |
| 2018/0244570 A1* | 8/2018 | Caillet | C03C 17/361 |
| 2019/0218140 A1* | 7/2019 | Mercadier | C03C 17/36 |
| 2020/0039874 A1 | 2/2020 | Veerasamy et al. | |
| 2020/0209436 A1* | 7/2020 | Nakamura | C03C 17/3482 |
| 2020/0277223 A1* | 9/2020 | You | C03C 17/36 |
| 2021/0163347 A1* | 6/2021 | You | C03C 17/366 |
| 2021/0403375 A1* | 12/2021 | Schneider | E06B 3/6621 |
| 2022/0009827 A1* | 1/2022 | Guimard | C03C 17/3655 |
| 2022/0017409 A1* | 1/2022 | Turkuz | C03C 17/36 |
| 2022/0144698 A1* | 5/2022 | Fessler | C03C 17/3634 |

FOREIGN PATENT DOCUMENTS

| | | | | |
|---|---|---|---|---|
| EP | 3004015 B1 * | 8/2017 | | C03C 17/3644 |
| WO | 2020021387 A1 | 1/2020 | | |
| WO | WO-2021004685 A1 * | 1/2021 | | B32B 17/10036 |

* cited by examiner

COATED ARTICLE WITH IR REFLECTING LAYER DESIGNED FOR LOW U-VALUE AND HIGHER G-VALUE AND METHOD OF MAKING SAME

This invention relates to a coated article having a low-emissivity (low-E) coating including an infrared (IR) reflecting layer of or including a material such as silver or the like. The low-E coating is designed so that the coated article can realize a low U-value in combination with a high solar heat gain (g value). It has surprisingly and unexpectedly been found that providing, in the top dielectric portion of the coating above the silver, a high-low-high sequence, regarding index of refraction (n), allows for a low U-value and a higher g value to be obtained (i.e., allows for low U-value to be achieved, without significantly sacrificing g value). Other desirable features include one or more of: high visible transmission, consistent and low emissivity values, thermal stability upon optional heat treatment such as thermal tempering, and desirable coloration and/or reflectivity values. Coated articles herein may be used in the context of insulating glass (IG) window units, or in other suitable applications such as monolithic window applications, laminated windows, and/or the like.

BACKGROUND AND SUMMARY OF EXAMPLE EMBODIMENTS OF THE INVENTION

Coated articles are known in the art for use in window applications such as insulating glass (IG) window units, vehicle windows, monolithic windows, and/or the like. In certain example instances, designers of coated articles often strive for a combination of high visible transmission, desirable color, low emissivity (or emittance), low sheet resistance ($R_s$), and/or low U-values in the context of IG window units. High visible transmission and desired coloration may permit coated articles to be used in applications where these characteristics are desired such as in IG or vehicle window applications, whereas low emissivity and low sheet resistance permit such coated articles to block significant amounts of IR radiation so as to reduce for example undesirable heating of vehicle or building interiors.

Low-E coatings are typically deposited on a glass substrate by sputterings. Emissivity and/or sheet resistance values of a coating or coated article are driven in large part by the IR reflecting layer(s) which is/are typically made of silver or the like.

U.S. Pat. No. 10,100,202 (the disclosure of which is hereby incorporated herein by reference in its entirety) discloses the following low-E coating, where the listed thicknesses are in angstroms (Å):

TABLE 1

(Example Materials/Thicknesses; U.S. Pat. No. 10,100,202)

| Layer | Example (Å) |
|---|---|
| $ZrSiO_xN_y$ | 74 Å |
| $TiO_x$ | 30 Å |
| ZnSnO | 53 Å |
| $ZnAlO_x$ | 48 Å |
| ZnSnO | 41 Å |
| $ZnAlO_x$ | 123 Å |
| Ag | 87 Å |
| $NiCrO_x$ | 30 Å |
| ZnSnO | 66 Å |
| $ZnAlO_x$ | 170 Å |

TABLE 1-continued (Example Materials/Thicknesses; U.S. Pat. No. 10,100,202)

| Layer | Example (Å) |
|---|---|
| $SnO_2$ | 55 Å |
| $Si_3N_4$ | 111 Å |
| $ZrO_2$ | 30 Å |

It is often desirable to achieve low U-values for IG window units in moderate and cold climates, such as in Europe. Traditional coated articles in this respect, such as that of U.S. Pat. No. 10,100,202 mentioned above, are single silver stacks where the silver based layer is provided together with medium/high index dielectric layers. Low U-values typically require thicker silver layers (i.e., U-value can be lowered by thickening the silver based layer), but thickening the silver then typically results in higher reflection values and a lower and narrower transmission window. This negatively affects the solar heat gain (g value), which is a significant parameter that is desired to be as high in many situations. In other words, in conventional coatings, thickening the silver in order to lower U-value typically also results in lowering g value which is undesirable. Thus, conventional designs for achieving lower U-value compromise on reflected colour and g-value to obtain the required U-value and emissivity.

In view of the above, it will be appreciated that there exists a need in the art for a coated article including a low-E coating that is designed so as to achieve a combination of a low U-value and a high solar heat gain (g value). In other words, there exists a need in the art for a low-E coating design that can achieve a low U-value without comprising g value. It would also be desirable to provide such a coating that also achieves one or more of: high visible transmission, low emissivity, thermal stability upon optional heat treatment such as thermal tempering, and desirable coloration and/or reflectivity values.

It has surprisingly and unexpectedly been found that providing, in the top dielectric portion of the coating above the silver, a high-low-high sequence, regarding index of refraction (n), allows for a low U-value and a higher g value to be obtained. In other words, this allows for low U-value to be achieved, without significantly sacrificing g value. The sequence may include, for example, a layer sequence comprising a low index layer such as silicon oxide (e.g., $SiO_2$, which optically may be doped with other material such as Al and/or N) or the like sandwiched between (directly or indirectly) at least first and second layers each having a refractive index (n) of at least 2.0, more preferably of at least 2.10, and sometimes one or more having a refractive index of at least 2.20. Example high index layers include, for example, titanium oxide (e.g., $TiO_2$) and/or zirconium oxide (e.g., $ZrO_2$). Refractive indices (n) herein are considered at 550 nm.

In certain example embodiments of this invention, there is provided an insulating glass (IG) window unit including a coated article including a coating supported by a glass substrate, the coating comprising moving away from the glass substrate: a dielectric layer; a layer comprising zinc oxide; an infrared (IR) reflecting layer comprising silver located on the substrate over and directly contacting the layer comprising zinc oxide; and a first dielectric high index layer, having a refractive index (n) of at least 2.0, located on the substrate over at least the IR reflecting layer; a second dielectric high index layer, having a refractive index (n) of at least 2.0, located on the substrate over at least the first dielectric high index layer; a dielectric low index layer, having a refractive index no greater than 1.70, located between at least the first and second dielectric high index layers; wherein the coating contains only one silver based IR reflecting layer; and wherein the IG window unit has a U-value of no greater than 1.20 and a g-value of at least 0.550.

In an example embodiment of this invention, an insulating glass (IG) window unit includes a coated article including a coating supported by a glass substrate, the coating comprising moving away from the glass substrate: a dielectric layer comprising zirconium silicon oxynitride; a layer comprising titanium oxide; a layer comprising zinc oxide; an infrared (IR) reflecting layer comprising silver located on the substrate over and directly contacting the layer comprising zinc oxide; and a layer comprising metal oxide located over at least the IR reflecting layer comprising silver; another layer comprising an oxide of titanium located on the substrate over at least the IR reflecting layer; a layer comprising an oxide of zirconium located on the substrate over at least the another layer comprising the oxide of titanium; a layer comprising silicon oxide located between at least the another layer comprising the oxide of titanium and the layer comprising the oxide of zirconium; wherein the coating contains only one silver based IR reflecting layer; and wherein the IG window unit has a U-value of no greater than 1.10 and a g-value of at least 0.550.

DETAILED DESCRIPTION OF EXAMPLE EMBODIMENTS OF THE INVENTION

Figure 1:
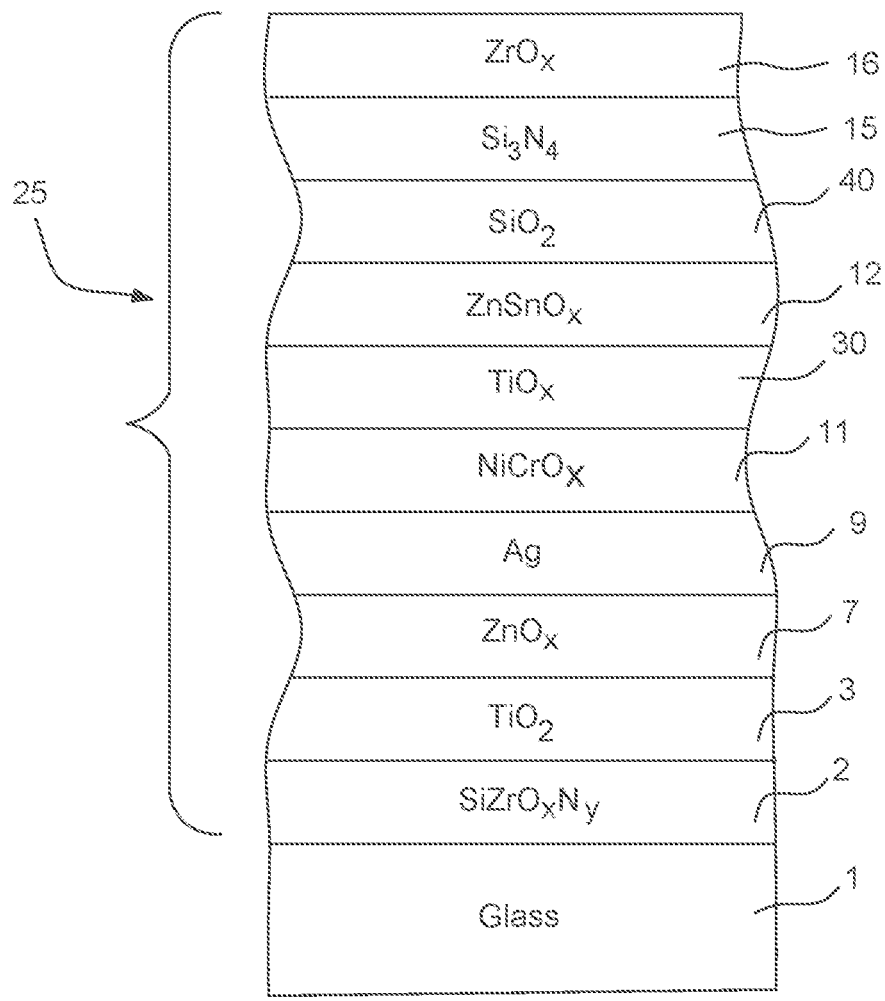
FIG. 1 is a cross sectional view of a coated article according to an example embodiment of this invention.

Referring now to the drawings in which like reference numerals indicate like parts throughout the several views.

Coated articles herein may be used in applications such as monolithic windows, IG window units that include a monolithic coated article, vehicle windows, and/or any other suitable application that includes single or multiple substrates such as glass substrates.

It will be appreciated form the above that there exists a need in the art for a coated article including a low-E coating that is designed so as to achieve a combination of a low U-value and a high solar heat gain (g value). In other words, there exists a need in the art for a low-E coating design that can achieve a low U-value without comprising g value. It would also be desirable to provide such a coating that also achieves one or more of: high visible transmission, low emissivity, thermal stability upon optional heat treatment such as thermal tempering, and desirable coloration and/or reflectivity values.

It has surprisingly and unexpectedly been found that providing, in the top dielectric portion of the coating 25 above the silver 9, a high-low-high sequence, regarding index of refraction (n), allows for a low U-value and a higher g value to be obtained, and also provides for a more neutral color appearance. In other words, this allows for low U-value to be achieved, without significantly sacrificing g value. The sequence may include, for example, a layer sequence comprising a low index layer 40 such as silicon oxide (e.g., $SiO_2$, which optically may be doped with other material such as Al and/or N) or the like sandwiched between (directly or indirectly) at least first and second high index layers (e.g., 30 and 16, respectively) each having a refractive index (n) of at least 2.0, more preferably of at least 2.10, and sometimes one or more having a refractive index of at least 2.20. Example high index layers include, for example, titanium oxide (e.g., $TiO_2$), niobium oxide, and/or zirconium oxide (e.g., $ZrO_2$). Refractive indices (n) herein are considered at 550 nm.

In certain example embodiments of this invention, it has also been found that the provision of a layer of or including zirconium silicon oxynitride 2 in the lower dielectric portion of the coating 25, between the glass substrate 1 and the IR reflecting layer (e.g., of silver or the like) 9 improves the quality of the IR reflecting layer 9 thereby permitting the coated article to realized low emissivity values with low tolerance variations. Providing zirconium silicon oxynitride 2 under a layer(s) of or including one or more of zinc stannate and/or zinc oxide (e.g., 7), in the lower dielectric portion of the coating 25, has been found to improve the quality of the silver and thus improve (lower) emissivity and lower emissivity tolerance values as discussed herein. Even though the zirconium silicon oxynitride 2 is not directly contacting the IR reflecting layer 9, it still improves the quality of the overlying IR reflecting layer 9 thereby permitting thermal properties of the coating to be improved and manufactured in a more consistent manner. The IR reflecting layer 9 has been found to grow better and have a smoother base which can more easily be repeated on a consistent basis. It has also been surprisingly found that the provision of a layer of or including titanium oxide (e.g., $TiO_2$) 3 over the zirconium silicon oxynitride 2 results in an increase in visible transmission of the coated article and improved optical properties, as well as an increase in line speed.

The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes. The coated article may or may not be heat treated in different embodiments of this invention.

FIG. 1 is a cross sectional view of a coated article according to an example embodiment of this invention. The coated article includes glass substrate 1 (e.g., clear, green, bronze, or blue-green glass substrate from about 1.0 to 10.0 mm thick, more preferably from about 1.0 mm to 6.0 mm thick, with an example glass substrate being a clear glass substrate about 3.8 to 4.0 mm thick), and a multi-layer low-E coating (or layer system) 25 provided on the substrate 1 either directly or indirectly. As shown in FIG. 1 for example, the coating 25 includes: dielectric layer of or including zirconium silicon oxynitride 2, dielectric layer of or including titanium oxide (e.g., $TiO_2$) 3, dielectric layer(s) 7 of or including zinc oxide (e.g., which may be doped with other material such as Al or Sn), IR reflecting layer 9 of or including silver, gold, or the like, upper contact layer 11 of or including Ni, Cr, NiCr, NiCrMo, or any oxide thereof such as an oxide of NiCr or an oxide of NiCrMo, high index dielectric layer 30 of or including a high index material such as titanium oxide (e.g., $TiO_2$) or niobium oxide, dielectric layer 12 of or including a metal oxide such as zinc stannate or the like, low index dielectric layer 40 of or including a low index material such as silicon oxide (e.g., $SiO_2$) which may be doped with other element(s) such as N and/or Al, dielectric layer 15 of or including a material such as silicon nitride (e.g., $Si_3N_4$) and/or silicon oxynitride, and an high index dielectric layer 16 of a material such as zirconium oxide (e.g., $ZrO_2$) which may in certain example instances be a protective overcoat. Other layers and/or materials may additionally be provided in certain example embodiments of this invention, and it is also possible that certain layers may be removed or split in certain example instances. For example, optionally a layer of or including silicon nitride and/or silicon oxynitride (not shown) may be provided between the glass substrate 1 and the zirconium silicon oxynitride 2. As another example, a layer of or including tin oxide (e.g., $SnO_2$ or zinc stannate) may be provided directly between layers 15 and 40, or alternatively directly between layers 12 and 14, in certain example embodiments. As another example, a layer of or including silicon nitride and/or silicon oxynitride may be provided between the glass substrate 1 and layer 2 in certain example embodiments. As yet another example, a layer of or including zinc oxide (e.g., ZnO, optionally doped with Al or the like, or zinc stannate) may be provided directly between layers 15 and 40, or alternatively directly between layers 12 and 14, in certain example embodiments. Moreover, the lower dielectric portion of the stack, namely the portion of the stack between the glass 1 and silver based layer 9, may be made up of any lower dielectric stack disclosed in U.S. Pat. No. 10,100,202, for example. Moreover, other materials may be used for particular layers instead of the materials mentioned above in certain example embodiments of this invention.

Figure 2:
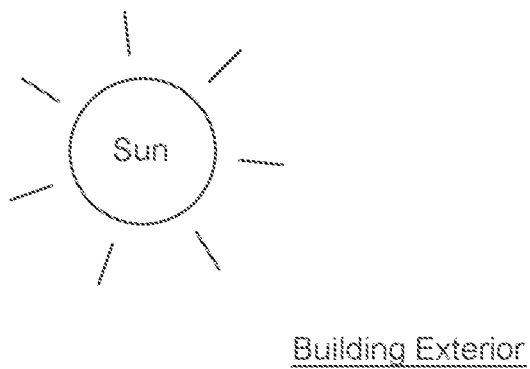
FIG. 2 is a cross sectional view of part of an insulating glass (IG) window unit including the monolithic coated article of FIG. 1 according to an example embodiment of this invention.
Figure 2:
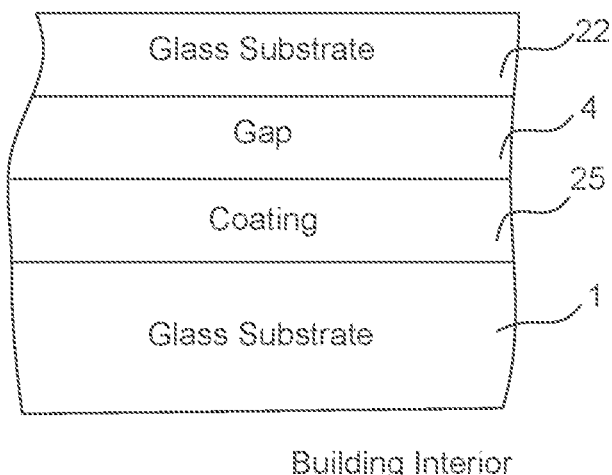

In monolithic instances, the coated article includes only one substrate such as glass substrate 1 (see FIG. 1). However, monolithic coated articles herein may be used in devices such as IG window units for example. Typically, as shown in FIG. 2, an IG window unit may include two spaced apart glass substrates 1 and 22, with a gap 4 defined therebetween. Example IG window units are illustrated and described, for example, in U.S. Pat. Nos. 5,770,321, 5,800,933, 6,524,714, 6,541,084 and US 2003/0150711, the disclosures of which are all hereby incorporated herein by reference. An example IG window unit as shown in FIG. 2 may include, for example, the coated glass substrate 1 shown in FIG. 1 coupled to another glass substrate 22 via spacer(s), sealant(s) or the like with a gap 4 being defined therebetween. This gap 4 between the substrates in IG unit embodiments may in certain instances be filled with a gas such as argon (Ar), or a mixture of air and argon gas. An example IG unit may comprise a pair of spaced apart substantially clear glass substrates each about 4 mm (e.g., 3.8 mm) thick one of which is coated with a coating 25 herein in certain example instances, where the gap 4 between the substrates may be from about 5 to 30 mm, more preferably from about 10 to 20 mm, and most preferably about 16 mm. In certain example instances, the coating 25 may be provided on the side of the inner glass substrate 1 facing the gap (although the coating may be on the other substrate in certain alternative embodiments) as shown in FIG. 2, which is often referred to as surface number three of the IG window unit.

In certain example IG unit embodiments of this invention, the coating 25 is designed such that the resulting IG unit (e.g., with, for reference purposes, a pair of 3.8 mm clear glass substrates 1, 22 spaced apart by 16 mm with a mixture of air and Ar gas in the gap) has a U-value of no greater than 1.4 $W/(m^2K)$, more preferably no greater than 1.3 $W/(m^2K)$, sometimes no greater than 1.1 $W/(m^2K)$, and sometimes no greater than 1.0 $W/(m^2K)$. As mentioned above, U-value may be lowered by increasing the thickness of the silver based IR reflecting layer 9. However, this coating is designed so that increasing the thickness of the IR reflecting layer 9 does not compromise g-value. U-value herein is measured and referred to in accordance with EN 410-673_2011—Winter, the disclosure of which is hereby incorporated herein by reference. Indeed, it is preferred that the optical and thermal features discussed herein are achieved when the coating 25 contains only one silver-based IR reflecting layer (e.g., as shown in FIG. 1), as opposed to a double or triple-silver layer stack. In certain example IG unit embodiments of this invention, the coating 25 is designed such that the resulting IG has a g-value of at least 0.550, more preferably of at least 0.570.

The nitrogen/oxygen ratio in the zirconium silicon oxynitride layer 2 has been found to be significant in certain instances. Too much oxygen in zirconium silicon oxynitride layer 2 results in a reduced sputter rate and does not appear to help reduce absorption or increase transmissions. Too much oxygen in this layer 2 has also been found to result in undesirable haze. Accordingly, in certain example embodiments of this invention, the layer 2 of or including zirconium silicon oxynitride has a nitrogen to oxygen ratio (nitrogen/oxygen ratio) of at least 3, more preferably at least 4, and even more preferably at least 5 (atomic). Thus, layer 2 contains at least three times more N than O, more preferably at least four times as much N than O, and most preferably at least five times as much N than O. For example in certain example embodiments of this invention, layer 2 is sputter-deposited using a ZrSi target, using from about 0.4 to 2.0, more preferably from about 0.5 to 1.5, and most preferably about 0.8 to 1.0 ml/kW $O_2$ gas, and from about 4.0 to 10.0, more preferably from about 5.0 to 8.0, and most preferably from about 6.0 to 7.0 ml/kW $N_2$ gas. Argon (Ar) gas may also be used in the sputtering process.

Moreover, it has also been found that, in zirconium silicon oxynitride layer 2, too much Zr results in an undesirably brittle material and too little Zr causes the silver layer 9 to be not as smooth and degrades coating qualities. It has been found that better results in these respects are achieved when the layer 2 contains more Si than Zr (atomic %). For example, the Zr/Si (atomic) ratio in layer 2 (and in the sputtering target for depositing layer 2) is preferably from 0.20 to 0.60, more preferably from 0.30 to 0.47, and most preferably from 0.35 to 0.44. For example, a sputtering target(s) containing about 40% Zr and about 60% Si may be used to sputter-deposit layer 2.

Dielectric layer 3 may be of or include titanium oxide in certain example embodiments of this invention. The titanium oxide of layer 3 (and layer 30) may in certain example instances be represented by $TiO_x$, where x is from 1.5 to 2.5, most preferably about 2.0. The titanium oxide layer 3 and/or layer 30 may be deposited via sputtering or the like in different embodiments. Layers 3 and 30 may have an index of refraction (n), at 550 nm, of at least 2.0, more preferably of at least 2.1, and possibly from about 2.3 to 2.6 when the layer is of or includes titanium oxide. In certain embodiments of this invention, the thickness of titanium oxide inclusive layer 3 is controlled so as to allow a* and/or b* color values (e.g., transmissive, film side reflective, and/or glass side reflective) to be fairly neutral (i.e., close to zero) and/or desirable. Other materials may be used in addition to or instead of titanium oxide in certain example instances. In certain alternative embodiments, the Ti in oxide layer 3 may be replaced with another metal.

Layer 7 in certain embodiments includes zinc oxide (e.g., ZnO). The zinc oxide of these layers may contain other materials as well such as Al (e.g., to form $ZnAlO_x$). For example, in certain example embodiments of this invention, one or more of zinc oxide layers may be doped with from about 1 to 10% Al, more preferably from about 1 to 5% Al, and most preferably about 1 to 4% Al.

In certain example embodiments, a layer of or including tin oxide or zinc stannate (e.g., $ZnSnO_x$) may be provided between and contacting layers 3 and 7 in the FIG. 1 embodiment. This layer (not shown in FIG. 1) may be essentially the same as layer 12 described herein.

Dielectric layer 15 may be of or include silicon nitride in certain embodiments of this invention. Silicon nitride layer 15 may, among other things, improve heat-treatability of the coated articles, e.g., such as thermal tempering or the like, and may or may not include some oxygen. The silicon nitride of layer 15 may be of the stoichiometric type (i.e., $Si_3N_4$), or alternatively of the Si-rich type in different embodiments of this invention.

Infrared (IR) reflecting layer 9 is preferably substantially or entirely metallic and/or conductive, and may comprise or consist essentially of silver (Ag), gold, or any other suitable IR reflecting material. IR reflecting layer 9 helps allow the coating to have low-E and/or good solar control characteristics. The IR reflecting layers may, however, be slightly oxidized in certain embodiments of this invention and may optionally be doped with other material such as Pd or the like. Coating 25 preferably contains only one silver-based IR reflecting layer 9 in preferred embodiments of this invention.

The upper contact layer 11 may be of or include nickel (Ni) oxide, chromium/chrome (Cr) oxide, or a nickel alloy oxide such as nickel chrome oxide ($NiCrO_x$), or other suitable material(s) such as Ni, Ti or an oxide of Ti, or $NiTiO_x$, in certain example embodiments of this invention. The use of, for example, $NiCrO_x$ in these layers allows durability to be improved. The $NiCrO_x$ of these layers may be fully oxidized in certain embodiments of this invention (i.e., fully stoichiometric), or alternatively may only be partially oxidized (i.e., sub-oxide). In certain instances, the $NiCrO_x$ layer 11 may be at least about 50% oxidized. Descriptions of various types of oxidation graded contact layers that may optionally be used are set forth in U.S. Pat. No. 6,576,349, the disclosure of which is hereby incorporated herein by reference. Contact layer 11 may or may not be continuous in different embodiments of this invention across the entire underlying IR reflecting layer 9.

As discussed herein, it has surprisingly and unexpectedly been found that providing, in the top dielectric portion of the coating 25 above the silver 9, a high-low-high sequence, regarding index of refraction (n), allows for a low U-value and a higher g value to be obtained, and also provides for a more neutral color appearance. In FIG. 1, this high-low-high sequence does not directly contact each other, and includes low index layer 40 such as silicon oxide (e.g., $SiO_2$, which optically may be doped with other material such as Al and/or N) or the like sandwiched between (directly or indirectly) at least first and second high index layers (e.g., 30 and 16, respectively) each having a refractive index (n) of at least 2.0, more preferably of at least 2.10, and sometimes one or more having a refractive index of at least 2.20. Example high index layers include, for example, titanium oxide (e.g., $TiO_2$), niobium oxide, and/or zirconium oxide (e.g., $ZrO_2$). Refractive indices (n) herein are considered at 550 nm.

Low index dielectric layer 40 (e.g., silicon oxide, such as $SiO_2$) preferably has a refractive index (n) of no greater than 1.75, more preferably no greater than 1.70, even more preferably on greater than 1.60, and most preferably no greater than 1.55. The silicon oxide of layer 40 may be doped with other material(s) in certain example embodiments, such as Al and/or N.

High index dielectric layer 30 (e.g., titanium oxide, such as $TiO_2$) preferably has a refractive index (n) of at least 2.0, more preferably of at least 2.10, and most preferably of at least 2.20, or at least 2.25. Example high index layers include, for example, titanium oxide (e.g., $TiO_2$), niobium oxide, and/or zirconium oxide (e.g., $ZrO_2$). Refractive indices (n) herein are considered at 550 nm. While FIG. 1 shows layer 12 between high index layer 30 and low index layer 40, it is possible for layer 12 to be omitted so that high index layer 30 may directly contact low index layer 40 in certain example embodiments.

High index dielectric layer 16 (e.g., zirconium oxide, such as $ZrO_2$) preferably has a refractive index (n) of at least 2.0, more preferably of at least 2.10, and most preferably of at least 2.20. This layer may be doped with other element(s) in certain example embodiments of this case, or may be replaced with another high index material.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 2 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses may be used in different embodiments of this invention, example thicknesses and materials for the respective layers on the glass substrate 1 in the FIG. 1 embodiment are as follows, from the glass substrate 1 outwardly (e.g., the Al content in the zinc oxide layer 7 may be from about 1-10%, more preferably from about 1-3% in certain example instances):

TABLE 2

(Example Materials/Thicknesses; Fig. 1 Embodiment)

| Layer | Preferred Range (Å) | More Preferred (Å) | Example (Å) |
|---|---|---|---|
| $ZrSiO_xN_y$ (layer 2) | 40-250 (or 20-250) Å | 50-120 Å | 90 Å |
| $TiO_x$ (layer 3) | 15-250 Å | 30-150 Å | 129 Å |
| $ZnAlO_x$ (layer 7) | 30-200 Å | 50-140 Å | 60 Å |
| Ag (layer 9) | 120-210 Å | 150-200 Å | 157 Å |
| $NiCrO_x$ (layer 11) | 10-80 Å | 20-70 Å | 25 Å |
| $TiO_x$ (layer 30) | 15-250 Å | 30-150 Å | 138 Å |
| ZnSnO (layer 12) | 30-160 Å | 50-120 Å | 106 Å |
| $SiO_2$ (layer 40) | 30-450 Å | 200-350 Å | 291 Å |
| $Si_3N_4$ (layer 15) | 20-350 Å | 30-100 Å | 43 Å |
| $ZrO_2$ (layer 16) | 10-60 Å | 18-40 Å | 23 Å |

In certain example embodiments of this invention, coated articles according to the FIG. 1 embodiment, or the other embodiments herein, may have the following characteristics set forth in Table 3 when measured monolithically or in an IG window unit, and these values refer to both heat treated and non-heat treated embodiments. Note that $E_n$ is normal emissivity/emittance.

TABLE 3

Low-E/Solar Characteristics (HT or non-HT)

| Characteristic | General | More Preferred | Most Preferred |
|---|---|---|---|
| $R_s$ (ohms/sq.): | <=8.0 | <=7.0 | <=5.0 |
| $E_n$: | <=7% | <=6% | <=5% or <=4% |

Moreover, coated articles including coatings according to the FIG. 1 and/or other embodiments herein may have the following optical/color/thermal stability characteristics (e.g., when the coating(s) is provided on a clear soda lime silica glass substrate 1 from 1 to 10 mm thick, preferably about 4 mm thick such as 3.8 mm thick), as shown in Table 4 below. In Table 4, all parameters are measured monolithically. Note that "f" stands for film side, and "g" stands for glass side. Thus, $R_fY$ is film side reflectance, which is visible reflectance measured form the film side of the coated substrate. And $R_gY$ is glass side reflectance, which is visible reflectance measured form the glass side of the coated substrate. Film side reflectance, and film side reflective color values a*f and b*f are typically deemed to be the most important when the coating 25 is provided on surface three of an IG window unit because this indicates how the outside of the building will appear. Note that ΔE* is a value indicative of thermal stability, and in particular how much the optical characteristics changes upon heat treatment (HT). The lower a ΔE* value, the less the applicable a*, b* and L* values change upon HT (e.g., thermal tempering). The low ΔE* values of the coatings discussed herein demonstrate that HT and non-HT versions of each coating substantially matching with respect to coloration. Note that the equation for determining ΔE* is known in the art and is described for example in U.S. Pat. No. 8,263,227, the disclosure of which is hereby incorporated herein by reference. It has surprisingly been found that the combination of the zinc stannate, zinc oxide, and zirconium silicon oxynitride in the lower dielectric stack reduces ΔE* values in a desirable manner making the coatings more thermally stable.

TABLE 4

Example Optical Characteristics (Monolithic, HT or non-HT)

| Characteristic | General | More Preferred |
|---|---|---|
| $T_{vis}$ (or TY)(Ill. C, 2 deg.): | >=75% | >=80% or >=86% |
| $a^*_t$ (Ill. C, 2°): | −5.0 to +1.0 | −3.0 to 0.0 |
| $b^*_t$ (Ill. C, 2°): | −2.0 to +6.0 | 0.0 to +4.0 |
| $R_fY$ (Ill. C, 2 deg.): | <=18% | <=12% |
| $a^*_f$ (Ill. C, 2°): | −5.0 to +8.0 | −2.0 to +3.25 |
| $b^*_f$ (Ill. C,2°): | −14.0 to +10.0 | −6.0 to +1.0 |
| $\Delta E^*_f$: | <=4.0 or <=2.0 | <=1.5 |
| $R_gY$ (Ill. C, 2 deg.): | <=20% | <=9% |
| $a^*_g$ (Ill. C, 2°): | −5.0 to +8.0 | −2.0 to +6.0 |
| $b^*_g$ (Ill. C, 2°): | −15.0 to +10.0 | −6.0 to 0 |
| $\Delta E^*_g$: | <=2.5 or <=2.0 | <=1.5 |

Moreover, coated articles including coatings according to the FIG. 1 and/or other embodiments herein may have the following optical characteristics when the coated article is provided in an IG window unit in certain example embodiments (see Table 5 below). These measurements are with respect to, for example and for purposes of reference, coating 25 being provided in an IG window unit where both glass substrates 1, 22 are clear soda lime silica glass substrates about 3.8-4.0 mm thick, coating 25 is on surface three of the IG unit as shown in FIG. 2, and when the gap between the substrates is about 16 mm thick and is filled with a mixture of air and argon gas. Note that U-value is measured and referred to in accordance with EN 410-673_2011—Winter.

TABLE 5

Example Optical Characteristics (IG Unit; HT or non-HT)

| Characteristic | General | More Preferred |
|---|---|---|
| $T_{vis}$ (or TY)(Ill. C, 2 deg.): | >=68% or >=70% | >=73% |
| $a^*_t$ (Ill. C, 2°): | −5.0 to +1.0 | −3.0 to 0.0 |
| $b^*_t$ (Ill. C, 2°): | −2.0 to +6.0 | 0.0 to +4.0 |
| $R_{outside}Y$ (Ill. C, 2 deg.): | <=25% | <=17% |
| $a^*_{outside}$ (Ill. C, 2°): | −5.0 to +8.0 | −2.0 to +2.0 |
| $b^*_{outside}$ (Ill. C, 2°): | −10.0 to +10.0 | −5.0 to +4.0 |
| $R_{interior}Y$ (Ill. C, 2 deg.): | <=25% | <=17% |
| $a^*_{interior}$ (Ill. C, 2°): | −5.0 to +5.0 | −2.0 to +3.0 |
| $b^*_{interior}$ (Ill. C, 2°): | −12.0 to +10.0 | −6.0 to 0 |
| U-value (W/(m$^2$K)): | <=1.20 | <=1.10 or <=1.0 |
| g-value: | >=0.550 | >=0.580 or >=0.585 |

EXAMPLES

Comparative Example (CE) 1 and Examples 1-2 are provided for purposes of example only, and are not intended to be limiting. These were made via sputtering to have the layers set forth below from the clear glass substrate 1 outwardly. They were measured monolithically. They were also put into IG window units as shown in FIG. 2. The silicon nitride layers were deposited by sputtering a silicon target (doped with about 8% Al) in an atmosphere including argon and nitrogen gas. Layer thicknesses below for each layer in Table 6 are in units of angstroms (Å).

TABLE 6

Layer Stacks of Examples 1-2

| Layer | Example 1 (Å) | Example 2 (Å) |
|---|---|---|
| $ZrSiO_xN_y$ (layer 2) | 195 | 90 |
| $TiO_x$ (layer 3) | 87 | 129 |
| $ZnAlO_x$ (layer 7) | 60 | 60 |
| Ag (layer 9) | 97 | 157 |
| $NiCrO_x$ (layer 11) | 25 | 25 |
| $TiO_x$ (layer 30) | 148 | 138 |
| ZnSnO (layer 12) | 127 | 106 |
| $SiO_2$ (layer 40) | 385 | 291 |
| $Si_3N_4$ (layer 15) | 36 | 43 |
| $ZrO_2$ (layer 16) | 23 | 23 |

Comparative Example 1 (CE1) is to be compared to Example 2, because they have similar thicknesses for the silver layer and one would thus normally assume this result in similar U-values. Relative to Ex. 2, CE1 omitted layer 2, replaced layers 12, 40 with an $SnO_2$ layer, and had the following layer thicknesses layer 3 was 140 Å thick, layer 7 was 120 Å thick, Ag layer 9 was 162 Å thick, layer 11 was 30 Å thick, layer 30 was 80 Å thick, the $SnO_2$ layer was 142 Å thick, layer 15 was 200 Å thick, and layer 16 was 40 Å thick.

Examples 1-2 and the CE1 had the following characteristics (annealed and non-HT, monolithic) (Ill. C, 2 degree observer).

TABLE 7

Monolithic, annealed (before tempering)

|  | Ex. 1 | Ex. 2 | CE1 |
|---|---|---|---|
| $T_{vis}$ (or TY): | 87.98% | 81.52% | 79.83% |
| $a^*_t$: | −1.17 | −2.34 | −3.3 |
| $b^*_t$: | 1.3 | 1.45 | 4.63 |
| $R_fY$: | 6.69% | 11.04% | 14.1% |
| $a^*_f$: | −1.11 | 2.96 | 4.32 |
| $b^*_f$: | −0.48 | −3.05 | −9.42 |
| $R_gY$: | 5.19% | 8.55% | 11.76% |
| $a^*_g$: | −0.39 | 5.68 | 6.36 |
| $b^*_g$: | −3.18 | −4.92 | −10.61 |

The coated articles were then put in IG window units on surface three as shown in FIG. 2, and the IG window units had the following characteristics (Ill. C, 2 degree observer). In all of the IG window units, for purposes of reference, the glass substrates 1 and 22 were clear and 4 mm thick, and the air gap in the IG window unit was 16 mm thick and filled with a mixture of air and argon gas.

TABLE 8

IG Window Unit

|  | Ex. 1 | Ex. 2 | CE1 |
|---|---|---|---|
| $T_{vis}$ (or TY): | 79.49% | 73.86% | 72.52% |
| $a^*_t$: | −1.77 | −2.8 | −3.71 |
| $b^*_t$: | 1.29 | 1.39 | 4.33 |
| $R_fY$: | 13.08% | 16.55% | 19.39% |
| $a^*_f$: | −1.49 | 1.28 | 2.36 |
| $b^*_f$: | −0.08 | −2.13 | −6.72 |
| $R_gY$: | 12.44% | 15.19% | 17.83% |
| $a^*_g$: | −0.63 | 2.66 | 3.41 |
| $b^*_g$: | −2.01 | −3.27 | −7.31 |
| $T_{sol}$: | 62.4 | 49.5 | 45.7 |
| $R_{sol}$: | 20.2 | 32 | 37 |
| $A_{sol}$: | 17.4 | 18.5 | 17.3 |
| TUV: | 40.2 | 33.7 | 24.6 |
| g-value: | 0.72 | 0.586 | 0.534 |
| SC: | 0.82 | 0.674 | 0.614 |
| LSG: | 1.11 | 1.261 | 1.358 |
| U-value: | 1.12 | 1.088 | 1.088 |
| Usum: | 1.12 | 1.088 | 1.088 |

CE1 is to be compared to Example 2, because CE1 and Example 2 have essentially the same thickness silver layer; namely about 160 Å and thus about the same U-value. In particular, both CE1 and Example 2 have a nice low U-value of 1.088. However, CE1 has a much lower g-value and less neutral coloration compared to Example 2. It can be seen that by adding the low index $SiO_2$ layer 40 to the dielectric overcoat in Example 2, the U-value could be improved by thickening the silver, but surprisingly and unexpectedly without sacrificing neutral color and/or g-value. In other words, the low U-value of Example 2 was achieved in combination with neutral color and a high g-value—this was not possible in CE1 which had a lower g-value of 0.534 and less neutral color evidenced by the higher a* and b* values from both the film and glass sides. This shows that especially for thick silver layers such as Example 2, the advantage of using the new top dielectric structure is highly beneficial in that it allows for a high g-value and neutral coloration. This is also advantageous in Example 1. The difference is also seen in comparing the spectral transmission and reflection data Example 2 compared to CE1. The gain in g-value in Example 2 may result mainly due to lower reflection and higher transmission in the visible spectral range, which can be seen in the tables above. Accordingly, it has surprisingly and unexpectedly been found that providing, in the top dielectric portion of the coating 25 above the silver 9, a high-low-high sequence, regarding index of refraction (n), allows for a low U-value and a higher g value to be obtained, and also provides for a more neutral color appearance.

In certain example embodiments of this invention, there is provided an insulating glass (IG) window unit including a coated article including a coating supported by a glass substrate, the coating comprising moving away from the glass substrate: a dielectric layer; a layer comprising zinc oxide; an infrared (IR) reflecting layer comprising silver located on the substrate over and directly contacting the layer comprising zinc oxide; and a first dielectric high index layer, having a refractive index (n) of at least 2.0, located on the substrate over at least the IR reflecting layer; a second dielectric high index layer, having a refractive index (n) of at least 2.0, located on the substrate over at least the first dielectric high index layer; a dielectric low index layer, having a refractive index no greater than 1.70, located between at least the first and second dielectric high index layers; wherein the coating contains only one silver based IR reflecting layer; wherein the coating has a normal emissivity ($E_n$) of no greater than 7%, and wherein the IG window unit has a U-value of no greater than 1.20 and a g-value of at least 0.550.

In the IG window unit of the immediately preceding paragraph, the first high index layer may be of or include an oxide of titanium (e.g., $TiO_2$).

In the IG window unit of any of the preceding two paragraphs, the second high index layer may be of or include an oxide of zirconium (e.g., $ZrO_2$).

In the IG window unit of any of the preceding three paragraphs, the low index layer may be of or include an oxide of silicon (e.g., $SiO_2$).

In the IG window unit of any of the preceding four paragraphs, the IR reflecting layer comprising silver may be at least 120 Å thick, more preferably at least 150 Å thick.

In the IG window unit of any of the preceding five paragraphs, the IG window unit may have a U-value of at least 0.570.

The IG window unit of any of the preceding six paragraphs may further comprise a layer comprising zinc stannate located between at least the low index layer and the first high index layer.

In the IG window unit of any of the preceding seven paragraphs, at least one of the first and second high index layers may have a refractive index of at least 2.20.

In an example embodiment of this invention, an insulating glass (IG) window unit includes a coated article including a coating supported by a glass substrate, the coating comprising moving away from the glass substrate: a dielectric layer comprising zirconium silicon oxynitride; a layer comprising titanium oxide; a layer comprising zinc oxide; an infrared (IR) reflecting layer comprising silver located on the substrate over and directly contacting the layer comprising zinc oxide; and a layer comprising metal oxide located over at least the IR reflecting layer comprising silver; another layer comprising an oxide of titanium located on the substrate over at least the IR reflecting layer; a layer comprising an oxide of zirconium located on the substrate over at least the another layer comprising the oxide of titanium; a layer comprising silicon oxide located between at least the another layer comprising the oxide of titanium and the layer comprising the oxide of zirconium; wherein the coating contains only one silver based IR reflecting layer; and wherein the IG window unit has a U-value of no greater than 1.10 and a g-value of at least 0.550.

The IG window unit of the immediately preceding paragraph may further include a layer comprising silicon nitride located between the glass substrate and the layer comprising zirconium silicon oxynitride.

In the IG window unit of any of the preceding two paragraphs, the IR reflecting layer comprising silver may be at least 120 Å thick, more preferably at least 150 Å thick.

In the IG window unit of any of the preceding three paragraphs, the IG window unit may have a U-value of at least 0.570.

The IG window unit of any of the preceding four paragraphs may further comprise a layer comprising zinc stannate located between at least the layer comprising silicon oxide and the another layer comprising the oxide of titanium.

The IG window unit of any of the preceding five paragraphs may further comprise a layer comprising silicon nitride located between at least the layer comprising silicon oxide and the layer comprising the oxide of zirconium.

In the IG window unit of any of the preceding six paragraphs, the IG window unit may have an exterior reflective a* value of from −2.0 to +2.0.

In the IG window unit of any of the preceding seven paragraphs, the IG window unit may have an exterior reflective b* value of from −5.0 to +4.0.

In the IG window unit of any of the preceding eight paragraphs, the coating may be located on surface three of the IG window unit.

The IG window unit of any of the preceding nine paragraphs may have a visible transmission of at least 70%.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An insulating glass (IG) window unit including a coated article including a coating supported by a glass substrate, the coating comprising moving away from the glass substrate:
   a dielectric layer comprising zirconium silicon oxynitride;
   a layer comprising titanium oxide;
   a layer comprising zinc oxide;
   an infrared (IR) reflecting layer comprising silver located on the substrate over and directly contacting the layer comprising zinc oxide; and
   a layer comprising metal oxide located over at least the IR reflecting layer comprising silver;
   another layer comprising an oxide of titanium located on the substrate over at least the IR reflecting layer;
   a layer comprising an oxide of zirconium located on the substrate over at least the another layer comprising the oxide of titanium;
   a layer comprising silicon oxide located between at least the another layer comprising the oxide of titanium and the layer comprising the oxide of zirconium, wherein the layer comprising silicon oxide does not directly contact the another layer comprising the oxide of titanium and does not directly contact the layer comprising the oxide of zirconium, and a dielectric layer comprising silicon nitride is located between and directly contacting the layer comprising silicon oxide and the layer comprising zirconium oxide;
   wherein the coating contains only one silver based IR reflecting layer;
   wherein the coating has a normal emissivity ($E_n$) of no greater than 7%, and
   wherein the IG window unit has a U-value of no greater than 1.10 and a g-value of at least 0.550.

2. The IG window unit of claim 1, further comprising a layer comprising silicon nitride located between the glass substrate and the layer comprising zirconium silicon oxynitride.

3. The IG window unit of claim 1, wherein the IR reflecting layer comprising silver is at least 120 Å thick.

4. The IG window unit of claim 1, wherein the IR reflecting layer comprising silver is at least 150 Å thick.

5. The IG window unit of claim 1, wherein the IG window unit has a U-value of at least 0.570.

6. The IG window unit of claim 1, further comprising a layer comprising zinc stannate located between at least the layer comprising silicon oxide and the another layer comprising the oxide of titanium.

7. The IG window unit of claim 1, wherein the IG window unit has an exterior reflective a* value of from −2.0 to +2.0.

8. The IG window unit of claim 1, wherein the IG window unit has an exterior reflective b* value of from −5.0 to +4.0.

9. The IG window unit of claim 1, wherein the coating is located on surface three of the IG window unit.

10. The IG window unit of claim 1, wherein the IG window unit has a visible transmission of at least 70%.

11. An insulating glass (IG) window unit including a coated article including a coating supported by a glass substrate, the coating comprising moving away from the glass substrate:
    a dielectric layer comprising zirconium silicon oxynitride;
    a layer comprising zinc oxide over at least the dielectric layer comprising zirconium silicon oxynitride;
    an infrared (IR) reflecting layer comprising silver located on the substrate over and directly contacting the layer comprising zinc oxide; and
    a first dielectric high index layer, having a refractive index (n) of at least 2.0, located on the substrate over at least the IR reflecting layer;
    a second dielectric high index layer, having a refractive index (n) of at least 2.0, located on the substrate over at least the first dielectric high index layer;
    a dielectric low index layer, having a refractive index no greater than 1.70, located between at least the first and second dielectric high index layers, wherein the low index layer does not directly contact the first high index layer and does not directly contact the second high index layer, and a dielectric layer comprising silicon nitride is located between and directly contacting the low index layer and the second high index layer;
    wherein the coating contains only one silver based IR reflecting layer; and
    wherein the IG window unit has a U-value of no greater than 1.20 and a g-value of at least 0.550.

12. The IG window unit of claim 11, wherein the first high index layer comprises an oxide of titanium.

13. The IG window unit of claim 11, wherein the second high index layer comprises an oxide of zirconium.

14. The IG window unit of claim 11, wherein the low index layer comprises an oxide of silicon.

15. The IG window unit of claim 11, wherein the IR reflecting layer comprising silver is at least 120 Å thick.

16. The IG window unit of claim 11, wherein the IR reflecting layer comprising silver is at least 150 Å thick.

17. The IG window unit of claim 11, wherein the IG window unit has a U-value of at least 0.570.

18. The IG window unit of claim 11, further comprising a layer comprising zinc stannate located between at least the low index layer and the first high index layer.

19. The IG window unit of claim 11, where at least one of the first and second high index layers has a refractive index of at least 2.20.

20. A coated article including a coating supported by a glass substrate, the coating comprising moving away from the glass substrate:
- a dielectric layer comprising zirconium silicon oxynitride;
- a layer comprising zinc oxide on the glass substrate and provided over the dielectric layer comprising zirconium silicon oxynitride;
- an infrared (IR) reflecting layer comprising silver located on the substrate over and directly contacting the layer comprising zinc oxide; and
- a first dielectric high index layer, having a refractive index (n) of at least 2.0, located on the substrate over at least the IR reflecting layer;
- a second dielectric high index layer, having a refractive index (n) of at least 2.0, located on the substrate over at least the first dielectric high index layer;
- a dielectric low index layer, having a refractive index no greater than 1.70, located between at least the first and second dielectric high index layers, wherein the low index layer does not directly contact the first high index layer and does not directly contact the second high index layer, and a dielectric layer comprising silicon nitride is located between and directly contacting the low index layer and the second high index layer;
- wherein the coating contains only one silver based IR reflecting layer.

21. The coated article of claim 20, wherein the first high index layer comprises an oxide of titanium.

22. The coated article of claim 20, wherein the second high index layer comprises an oxide of zirconium.

23. The coated article of claim 20, wherein the low index layer comprises an oxide of silicon.

24. The coated article of claim 20, wherein the IR reflecting layer comprising silver is at least 150 Å thick.

* * * * *